April 18, 1939.　　　R. P. FISHER　　　2,155,040

ROLLER BIT BEARING

Filed Aug. 26, 1938

Inventor
ROBERT P. FISHER,

By

Attorney

Patented Apr. 18, 1939

2,155,040

UNITED STATES PATENT OFFICE 2,155,040

ROLLER BIT BEARING

Robert P. Fisher, Los Angeles, Calif., assignor of fifty-one per cent to Rudolph Pageman, Los Angeles County, Calif.

Application August 26, 1938, Serial No. 226,950

13 Claims. (Cl. 255—71)

This invention relates to drill bits for the rotary drilling of wells, such as oil wells, and more particularly to the manner in which the cutters are rotatably carried by the bit structure.

This application is a continuation in part of my prior application, Serial No. 190,444, filed February 14, 1938, for Rotary drill bit.

For the purpose of decreasing the resistance to turning of a roller cutter on a bit structure, anti-friction bearings have been used. These bearings usually include rolling elements in the form of balls, cylindrical rollers, tapered rollers, or combinations of these specific rolling elements, co-operable with races formed in the cutters and in the bit structure. In attempting to design a bearing capable of effectively transmitting both axial, or endwise, and radial thrust components, complex structures have resulted, which are correspondingly difficult to produce accurately, and which are obviously attended with costly manufacture. It is, accordingly, an object of this invention to provide an anti-friction bearing for roller drill bits possessing simplicity in its construction and economy in its manufacture.

It is a further object of this invention to provide an anti-friction bearing for roller drill bits having a minimum number of parts for the functions performable by it, which parts are easily assembled and disassembled.

In the prior art anti-friction bearing assemblies for the roller cutters of drill bits, only a portion of the rolling bearing elements are effective in the transmission of radial thrust components. At most, only about one-half of those elements will transmit radial bearing loads, the elements and cooperable races remote from the formation engaging portions of the cutter being free from load. Thus, radial bearing loads are concentrated on about one-half of the circumference of the bit race or races adjacent the formation engaging cutter portions, producing a concentration of wear on those race parts, and also minimizing the load carrying capacity of the bearing by requiring that no more than one-half of the rolling bearing elements transmit the load.

It is, therefore, a further object of this invention to provide a bearing for drill bit cutters in which substantially all of the rolling bearing elements assist substantially simultaneously in the transmission of radial thrust components.

Another object of the invention is to transmit radial thrust components at any instantaneous position of a roller cutter from substantially the complete circumference of the cutter to its supporting bit structure.

This invention possesses many other advantages, and has other objects which may be made more easily apparent from a consideration of one embodiment of the invention. For the purpose of illustration, one form of the invention is shown in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawing.

Figure 1:
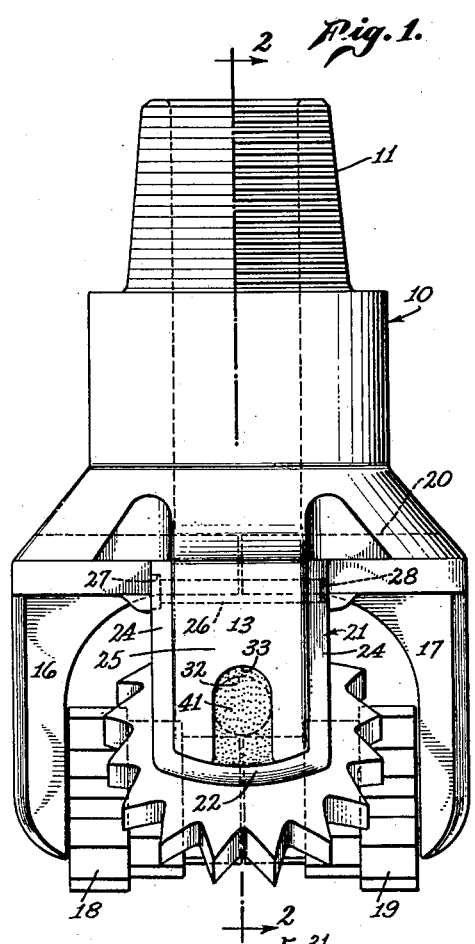
Figure 1 is a side elevation of a roller drill bit embodying the invention.
Figure 2:
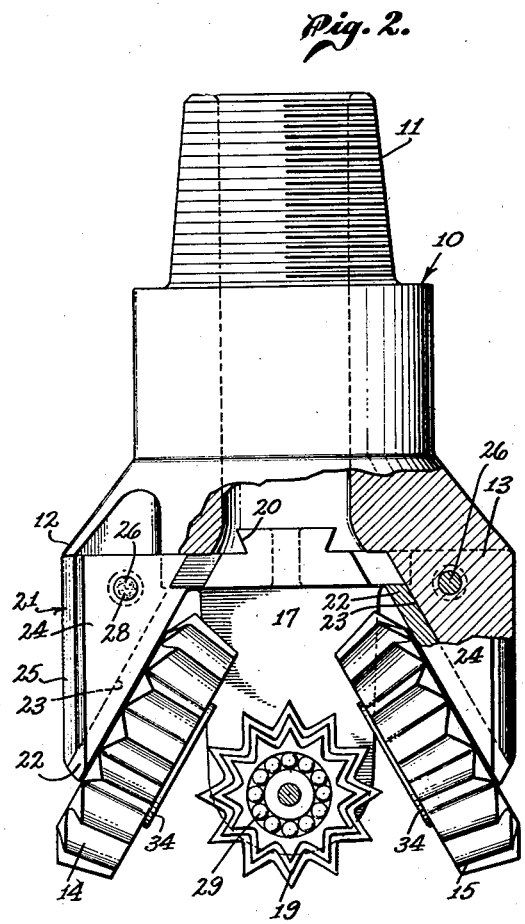
Figure 2 is a partially sectional view of the drill bit, taken generally along the plane 2—2 of Figure 1.

The drill bit disclosed in the drawing includes a supporting body or shank 10 having a threaded pin 11 at its upper end for its attachment to a drilling string (not shown), and is provided with a pair of downwardly extending legs 12, 13 for rotatably carrying the roller cutters 14, 15 which can remove the outer portion of the formation in the hole being operated upon. The shank also carries the bearing supporting members 16, 17 rotatably carrying the roller cutters 18, 19, which serve to remove the remaining, central portion of the formation material at the bottom of the hole. The details of the bit structure and its advantages are specifically described and claimed in my above identified application, to which attention is invited. It is, therefore, deemed unnecessary to include those structural details in this specification since the present invention can be understood without such description and is not concerned with the specific bit structure disclosed. At this point it is believed to be sufficient merely to note that the bearing supporting members 16, 17 for the central roller cutters are carried by the shank through the dove-tailed connections 20, and that the side roller cutters 14, 15 are also supported partially from bearing supporting members 21, 21, each having a web 22 abutting an inclined thrust surface 23 on a cooperative leg 12 or 13, with side wings 24, 24 cooperating with the sides of these legs. The outer ends of the wings can be welded to the outer surface 25 of each leg to secure the bearing supporting member 21 to the shank. To obtain additional securement, a rod 26 can be inserted through the side wings 24, 24 and leg 12 or 13, with its head 27 recessed in one of the side wings, and with its other end 28 welded to the other side wing to prevent its removal. The drawing also discloses a thrust bearing 29 between the inner end faces of the central rollers, although this feature has no concern with the invention now to be described.

Figure 3:
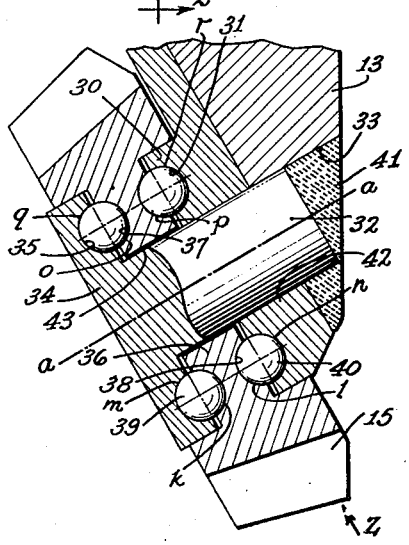
Figure 3 is a view of the bearing and cutter structure on an enlarged scale.

Each of the roller cutters 14, 15 is appropriately mounted and supported for rotation about an axis $a$—$a$, as disclosed in Figure 3. The web 22 of the bearing supporting member 21 has a bearing member 30 extending therefrom, in the end face of which a bearing race 31 is formed. A bearing pin 32 extends through the bearing supporting member 21 and into a bore or recess 33 in the depending leg 13, this bearing pin having a head 34 preferably formed integrally therewith, in the inner face of which is formed a bearing race 35. Each roller cutter 14, 15 is provided with a generally radial web 36 receivable, when assembled, between the respective races 31, 35 in the bearing supporting extension 30 and the pin head 34. The side faces of this cutter web are provided with bearing races 37, 38 facing the respective races 35, 31 in the bearing supporting extension and pin head. Anti-friction bearing members in the form of rolling elements or balls 39, 40 are positioned in the respective raceways, serving to transmit axial or endwise thrust components and radial thrust components between the roller cutter 15 on the one part and the bearing supporting member 21 and bearing pin 32 on the other part.

The cutter and bearing construction is easily assembled by positioning the bearing pin 32 horizontally and placing a proper number and size of bearing balls 39 in its race. The roller cutter 15 is then placed over the pin with one of its races 37 engageable with the set of balls in the pin race 35. The other race 38 in the cutter is then filled up with the second set of bearing balls 40, after which the bearing supporting member 21 is placed over the bearing supporting pin with its race 31 engageable with the second set of balls.

The aforementioned mode of assembly is only one of many that can be used. It is apparent, for example, that the race 31 in the bearing supporting member 21 could first be positioned horizontally, the bearing balls 40 placed in that race, the cutter placed on those bearing balls, its race 37 filled with the other bearing balls 39, and the bearing pin 32 then inserted through the cutter and web 22 of the bearing supporting member until the race 35 in its head portion engaged the last-mentioned set of balls.

Regardless of which mode of assembly is availed of, upon the parts occupying their relative positions, the bearing supporting member with the cutter and bearing pin carried thereby can then be placed over the depending leg 13 with the web portion 22 abutting the inclined leg surface 23, and with the bearing pin 32 positioned within the bore or recess 33 in the leg. Removal of the pin is prevented by means of the weld 41 filling the leg bore or recess 33 rigidly securing the end of the bearing pin to the leg. As aforementioned, the bearing supporting member 21 can be rigidly secured to the leg by means of welds and the rod 26.

It will be noted that the races in the cutter bearing supporting member 21 and pin head 24 are part of a toroidal surface generated about the axis $a$—$a$ of the bearing. Each surface is preferably semicircular in cross-section, although it is to be understood that cross-sectional shapes deviating from a semicircle can be used. The radius of each semicircle is preferably slightly greater than the radius of each ball in order to prevent sliding friction from occurring between the balls and the races. It will be noted further that each race subtends a material arcuate extent of each bearing ball, in the specific embodiment in the drawings covering almost 180 degrees on each ball. This is an important feature, particularly in conjunction with the formation of the races in the faces of the cutter web, pin head and bearing supporting member, which faces are substantially at right angles to the axis $a$—$a$ of the bearing assembly.

Due to the described arrangement of parts, radial components of thrust will be transmitted between the cutter 15 and the pin head 34 and bearing supporting member 21 through all of the balls 39, 40. This is exemplified in Fig. 3, in which the arrow Z designates a radial direction of a load imposed by the formation upon the cutter. This load will be transmitted through the lower half of the bearing balls, passing from the quadrant regions $k$, $l$ in the web races 37, 38 through the bearing balls to the generally diagonally opposite quadrant portions $m$, $n$ of the respective races 35, 31 in the pin head and bearing supporting member. This load will also be transmitted from the cutter through the upper bearing balls, passing from the web quadrant regions $o$, $p$ through the balls to the respective, generally diagonal quadrant portion $q$, $r$ of the races in the pin head and bearing supporting extension. The arrangement of races and balls therefore ensures that substantially all races and balls will cooperate in the transmission of radial loads simultaneously between the complete circumference of the cutter and the members fixed to the shank on which the cutter is mounted. The load carrying capacity of the bearing construction is accordingly much greater than prior art bearing assemblies.

The bearing construction described also functions to transmit axial or endwise thrusts between the cutter and its supporting members. Outwardly directed thrusts upon the cutter will be transmitted through the set of bearing balls 40 to the bearing supporting member 21. Inwardly directed thrusts will be transmitted from the cutter through the other set of bearing balls 39 to the pin head 34.

For the purpose of obtaining the maximum rigidity and sturdiness in the bearing assembly, the pin 32 makes a very close fit with the walls 42 of its cooperating bearing supporting member bore, through which it extends. In fact, the fit can be a driving one, which will not only add to the sturdiness of the assembly, but which will also maintain the bearing in assembly while the bearing supporting member 21 and bearing pin 32 are being welded to the shank leg 13. This is evident in view of the frictional resistance to relative movement occurring between the bearing pin 32 and the walls 42 of the bore in the bearing supporting member. As a further feature of the invention, a slight clearance is provided between the bearing pin and the central hole 43 in the cutter 15 in order to permit the bearing balls to assume all of the varieties of loadings transmitted between the cutter and the shank. However, in the event that wear occurs on the races and the balls, the cutter hole surface 43 can then engage the cylindrical surface on the bearing pin to assist in the transmission of radial thrust components of load between the cutter and the bearing pin.

I claim:

1. A roller bit including supporting means having races facing toward one another, a roller cutter having races positioned between said races, and bearing balls in said races for the simultaneous transmission of radial components of thrust between substantially the complete circumference of said cutter and said supporting means.

2. A roller bit including supporting means having toroidal races facing toward one another, a roller cutter having toroidal races positioned between said races, and bearing balls in said races for the simultaneous transmission of radial components of thrust between substantially the complete circumferences of said cutter and supporting means.

3. A roller bit including supporting means having oppositely disposed toroidal races, a roller cutter having toroidal races cooperable with said races, and bearing balls in said races for the simultaneous transmission of radial components of thrust between substantially the complete circumference of said cutter and said supporting means.

4. A roller bit including supporting means having toroidal races in its side faces, a roller cutter having toroidal races in its side faces cooperable with said races, balls in said races for transmitting bearing loads between said cutter and supporting means, said races substantially completely encompassing said balls for the simultaneous transmission of radial components of bearing loads between substantially the complete circumference of said cutter and supporting means.

5. A roller bit including supporting means having toroidal races in its sides facing toward one another, a roller cutter having toroidal races in its side faces positioned between and facing said races, balls in said races for transmitting bearing loads between said cutter and supporting means, said races substantially completely encompassing said balls for the simultaneous transmission of radial components of bearing loads between substantially the complete circumferential extent of said races.

6. A bearing assembly for roller bits including supporting means having side faces transversely of the bearing axis and facing toward one another, a race of generally semicircular cross-section in each side face, a roller cutter having a web extending between said faces, said web being provided with side faces transversely of the bearing axis and each face having a generally semicircular cross-sectional race therein oppositely disposed to an adjacent race in said supporting means, and respective sets of bearing balls in the supporting means races and adjacent web races for transmitting loads between said cutter and supporting means.

7. A roller bit including a bearing supporting member having a toroidal race in a side portion thereof, a bearing pin extending from said member and carrying a transverse extension having a toroidal race in a side portion, a roller cutter having an inwardly extending portion provided with a toroidal race adjacent said race in said member and a second toroidal race adjacent said race in said transverse extension, said races each extending on opposite sides of a median circle of revolution of their toroids and bearing balls in adjacent races for transmitting loads therebetween.

8. A roller bit including a bearing supporting member having a toroidal race in a side portion thereof, a bearing pin extending into said member and carrying a transverse extension having a toroidal race in a side portion, a roller cutter having a web between said member and extension, said web having respective toroidal races in its side faces adjacent respective races in said member and extension, said races being generally semicircular in cross-section, bearing balls in said races for transmitting loads therebetween, said web being free from direct bearing association with the pin to permit said balls to transmit simultaneously all radial components of bearing loads between substantially the complete circumferential extent of said races.

9. A roller bit including a bearing supporting member having a toroidal race in a side portion thereof, a bearing pin extending into said member and having an integral head with a toroidal race in a side portion, a roller cutter having a web surrounding said pin positioned between said head and member, said web having respective toroidal races in its side faces adjacent respective races in said member and head, said races being generally semicircular in cross-section, bearing balls in said races for transmitting loads therebetween, said web being free from direct bearing association with the pin to permit said balls to transmit simultaneously all radial components of bearing loads between substantially the complete circumferential extent of said races.

10. The combination defined in claim 9, said web being adjacent said pin and adapted to have bearing engagement therewith after sufficient wear occurs on said races and balls.

11. A roller bit including a shank having a depending leg, a bearing supporting member rigidly secured to said leg having a toroidal race in a side portion thereof, a bearing pin extending through said member and into said leg, said pin having a head with a toroidal race in a side portion, a roller cutter having a web surrounding said pin positioned between said head and member, said web having respective toroidal races in its side faces adjacent respective races in said member and head, said races being generally semicircular in cross-section, bearing balls in said races for transmitting loads therebetween, and means for securing said pin to said leg.

12. A roller bit including a shank having a depending leg provided with a thrust surface, a bearing supporting member abutting said thrust surface and mounted on said leg, a bearing pin extending through said member and into said leg to which it is welded, said pin having a head, respective toroidal races in side portions of said member and head facing toward one another, a roller cutter having a web surrounding said pin positioned between said head and member and having respective oppositely facing toroidal races in its side faces adjacent respective races in said member and head, said races being generally semicircular in cross-section, and bearing balls in said races.

13. A roller bit including a bearing supporting member having a toroidal race in a side portion thereof, a bearing pin extending into said member and having a snug fit therewith, said pin carrying a transverse extension having a toroidal race in a side portion, a roller cutter having a web between said member and extension free from direct bearing association with said pin, said web having respective toroidal races in its side faces adjacent respective races in said member and extension, said races being generally semi-circular in cross section, bearing balls in said races for transmitting loads therebetween, and means securely holding said pin and member in proper assembly whereby to permit said balls to transmit simultaneously all radial components of bearing loads between substantially the complete circumferential extent of said races.

ROBERT P. FISHER.